G. A. WATKINS,

Assignor to THE AMERICAN CHAIR SEAT CO.

Chair-Seat.

No. 9,021. Reissued Jan. 6, 1880.

WITNESSES

Geo. M. Finckel

D. P. Cowl

INVENTOR

Gardner A. Watkins, by G. M. Plympton, Jr.

ATTORNEY.

N. PETERS, PHOTO-LITHOGRAPHER, WASHINGTON, D. C.

UNITED STATES PATENT OFFICE.

GARDNER A. WATKINS, OF GARDNER, MASSACHUSETTS, ASSIGNOR TO THE AMERICAN CHAIR SEAT COMPANY, OF SAME PLACE.

CHAIR-SEAT.

SPECIFICATION forming part of Reissued Letters Patent No. 9,021, dated January 6, 1880.

Original No. 107,137, dated September 6, 1870. Application for Reissue filed May 8, 1879.

*To all whom it may concern:*

Be it known that I, GARDNER A. WATKINS, of Gardner, in the county of Worcester and State of Massachusetts, have invented a new and Improved Material for Chair Seats and Backs and for similar purposes; and I do hereby declare that the following is a full, clear, and exact description of the same, reference being had to the accompanying drawings, and to the letters of reference marked thereon, making part of this specification.

This invention relates to a new and useful improvement in the manufacture of a material for chair-seats, chair-backs, and other articles; and the invention consists in a material for the bottoms and backs of chairs and similar articles constructed of rattan strands, which are lengthened by uniting two or more of the strands together at or near their ends with cement, so that the strands so spliced may be woven together in any desirable manner.

Figure 1:
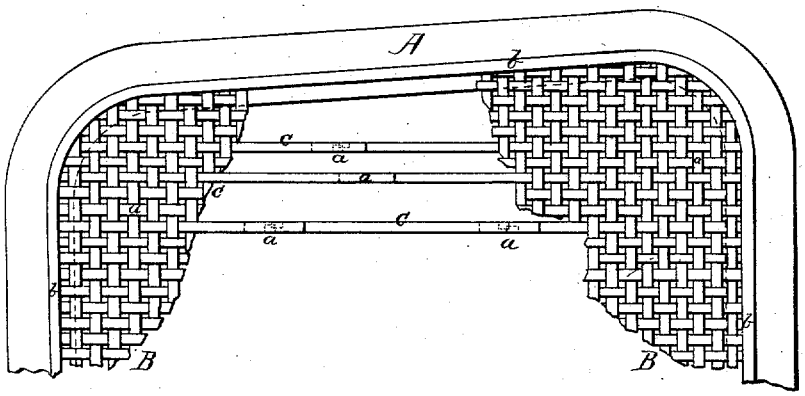
Figure 2:
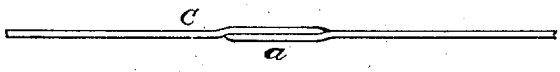

In the accompanying sheet of drawings, Figure 1 represents a portion of a chair-seat frame with the fabric of spliced strands applied thereto, and Fig. 2 a detailed view of the spliced strands.

Similar letters of reference indicate like parts in both figures.

In constructing a fabric for chair-bottoms, chair-backs, and similar articles, two or more of the ordinary strands of rattan are spliced and united together by cement, thereby lengthening them to any desired extent, so that the strands so spliced may be woven together into a substantial fabric.

A represents a seat-frame of a chair, to which is fixed the woven fabric B. The strands C, of which this fabric is woven, are spliced with cement at or near their ends, as at *a*, and thereby lengthened, the spliced joints occurring throughout the fabric.

A fabric for chair seats, chair-backs, &c., constructed with spliced rattan strands is particularly desirable on the score of economy, as it enables the manufacturer, in weaving the fabric for seats and backs, and for similar purposes, to make available the shortest as well as the longest strands, and thereby leave no waste.

Having now described my invention, what I claim as new, and desire to secure by Letters Patent, is—

1. As a new article of manufacture for chair-seats, chair-backs, and for similar purposes, rattan strands which are lengthened by splicing, with cement, two or more strands together, the strands so lengthened being capable of interweaving, and thereby forming a cloth with the spliced joints occurring throughout the fabric.

2. The process hereinbefore described of utilizing rattan strands by cementing and lengthening for weaving the same together, substantially as and for the purpose described.

GARDNER A. WATKINS.

Witnesses:
FRANCIS RICHARDSON,
LUCY A. TURNEY.